United States Patent
Smith

(10) Patent No.: US 7,133,028 B2
(45) Date of Patent: Nov. 7, 2006

(54) DRIVE ACTIVITY SAMPLING AND NOTIFICATION

(75) Inventor: Michael G. Smith, Tustin, CA (US)

(73) Assignee: Gateway Inc., Irvine, CA (US)

( * ) Notice: Subject to any disclaimer, the term of this patent is extended or adjusted under 35 U.S.C. 154(b) by 55 days.

(21) Appl. No.: 10/128,112

(22) Filed: Apr. 23, 2002

(65) Prior Publication Data

US 2003/0197676 A1  Oct. 23, 2003

(51) Int. Cl.
*G09G 5/00* (2006.01)

(52) U.S. Cl. .................. 345/168; 345/156; 345/157; 345/163; 345/172; 715/772; 715/859; 361/680; 361/685

(58) Field of Classification Search .............. 345/168, 345/156, 163, 157, 172, 170; 359/275; 361/680; 715/772

See application file for complete search history.

(56) References Cited

U.S. PATENT DOCUMENTS

| | | | |
|---|---|---|---|
| 5,065,357 A * | 11/1991 | Shiraishi et al. | 345/102 |
| 5,214,762 A * | 5/1993 | Bush et al. | 710/17 |
| 5,493,461 A | 2/1996 | Peach | |
| 5,604,662 A | 2/1997 | Anderson et al. | |
| 5,745,737 A | 4/1998 | Kayes et al. | |
| 5,754,436 A | 5/1998 | Walsh et al. | |
| 5,761,527 A * | 6/1998 | Clohset et al. | 710/1 |
| 5,799,198 A | 8/1998 | Fung | |
| 5,894,425 A * | 4/1999 | Saliba | 710/62 |
| 5,948,092 A * | 9/1999 | Crump et al. | 710/300 |
| 5,987,614 A | 11/1999 | Mitchell et al. | |
| 6,065,068 A | 5/2000 | Foote | |
| 6,085,325 A | 7/2000 | Jackson et al. | |
| 6,115,823 A | 9/2000 | Valasco et al. | |
| 6,154,360 A | 11/2000 | Kaczeus, Sr. et al. | |
| 6,182,179 B1 | 1/2001 | Foote | |
| 6,216,795 B1 | 4/2001 | Buchl | |
| 6,231,224 B1 | 5/2001 | Gamble et al. | |
| 2001/0015722 A1 * | 8/2001 | Blencowe | |
| 2002/0089816 A1 * | 7/2002 | Mizoguchi et al. | |
| 2003/0197680 A1 * | 10/2003 | Davenport | |

* cited by examiner

*Primary Examiner*—Richard Hjerpe
*Assistant Examiner*—Jennifer T. Nguyen
(74) *Attorney, Agent, or Firm*—Jeffrey A. Proehl; Woods Fuller Schultz & Smith

(57) ABSTRACT

A data storage device activity state is sampled and used to control a remote data storage device activity indicator. A disk drive activity signal is sampled by hardware either based on an edge transition of the activity signal, or on a periodic basis. If the state of the activity signal changes, state change data is sent via a controller to a keyboard. A disk drive status light on the keyboard is controlled by the change data. The controller is a USB host controller that sends the state change data to a USB function that controls the status light.

24 Claims, 2 Drawing Sheets

US 7,133,028 B2

DRIVE ACTIVITY SAMPLING AND NOTIFICATION

FIELD OF THE INVENTION

The present invention relates to providing indications of drive activity, and in particular to sampling of hard disk drive activity and providing a notification to a user based on the sampling.

BACKGROUND OF THE INVENTION

Disk drives and other storage devices are usually equipped with activity lights that indicate when the drive is actively transferring data to and from a computer system. These lights tend to flicker consistent with the activity of the drive. Further, the activity lights are located proximate the disk drives, which many times are not viewable by a user. In some cases, the drives are located in a portion of the system not viewable by a user during normal use of the drive. The system itself may be located beneath a table, and a user cannot see the activity light even if openly viewable otherwise.

SUMMARY OF THE INVENTION

A storage drive activity state is sampled. A representation of the sampling is used to control a remote drive activity indicator.

In one embodiment, a disk drive activity signal is sampled by hardware either based on an edge transition of the activity signal, or on a periodic basis. If the state of the activity signal changes, state change data is sent via a controller to a keyboard. A disk drive status light on the keyboard is controlled by the change data.

In a further embodiment, the controller is a USB host controller that sends the state change data or commands to a USB function that controls the status light.

DETAILED DESCRIPTION OF THE INVENTION

In the following description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
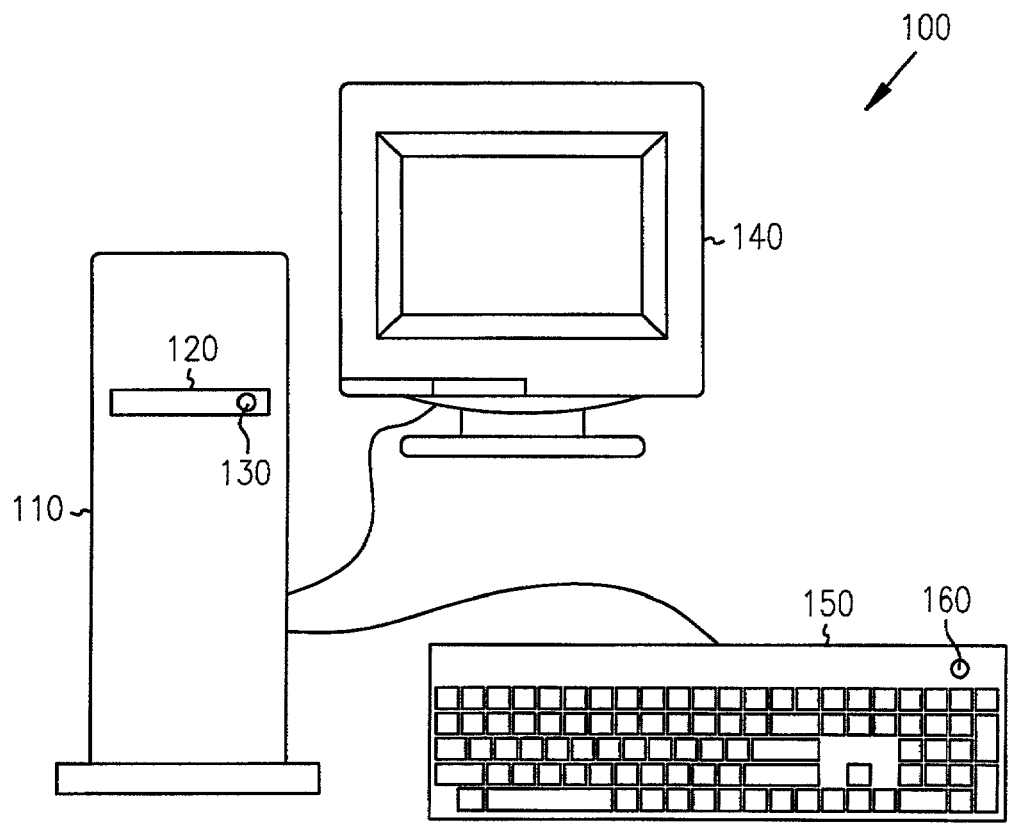
FIG. 1 is a block representation of a computer system having a remote disk activity indicator.

A personal computer is shown at 100 in FIG. 1. The computer 100 comprises a tower, or desk unit 110 having a disk drive 120 with an activity light 130 driven by an activity signal. The activity signal is generated when the disk drive is actively seeking and or transferring information to and from the disk. Disk drives include both hard disk drives, floppy disk drives, CD drives, DVD drives and other types of data storage devices, such as tape drives.

The computer 100 further includes a monitor or display 140 which is a standard CRT device in one embodiment, plasma display, flat panel, active matrix or other type of display device. A cursor control device such as a keyboard 150 having a plurality of keys, and a remote activity indicator 160 such as an LCD or LED is also provided. In further embodiments, the remote activity indicator 160 is located on a mouse device having cursor control and selection functions. The activity indicator is separate from the drive 120, since the drive may not be easily viewable by a user. The drive may not be visible because it is located within the tower, or the tower is located remotely from the keyboard and display, such as under a desk, or off to the side of a desk.

In one embodiment, the keyboard is coupled to the tower 110 by a USB (Universal Serial Bus) connection. A USB connection provides a high speed serial communication link. It is fast becoming the preferred method of attaching peripheral devices to a computer because of its ability to detect, power and configure the peripheral devices, as well as its ability to provide high speed data transfer. A USB controller usually comprises software and a USB connector in a host computer, such as tower 110. Communications with peripheral devices is carried on via transactions, which include commands for execution by functions in the peripheral device.

Figure 2:
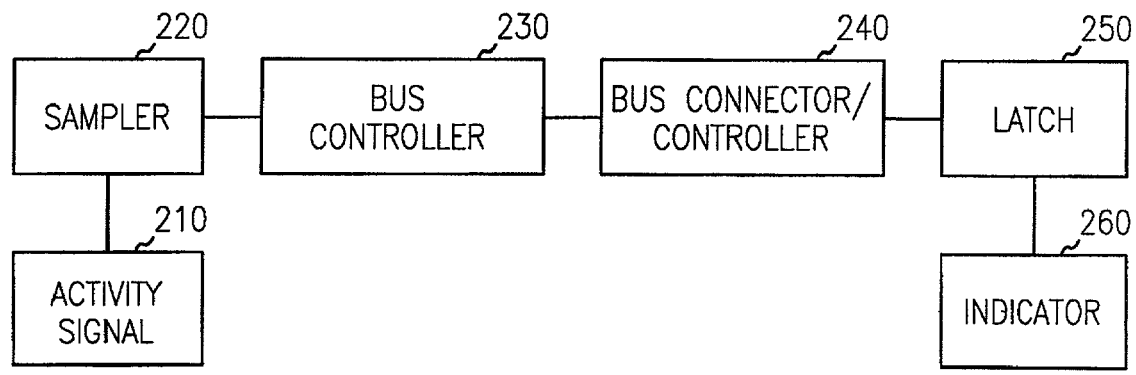
FIG. 2 is a block schematic diagram of modules for providing remote disk activity indications.

In operation, hardware in the tower 110 samples the activity signal 210 generated by the disk drive as shown in FIG. 2. A sampler 220 is shown in block form coupled to the activity signal. The sampler 220 operates in one of at least two different manners. In a first sampling mode, the activity signal is sampled in a periodic manner, such as every 30 milliseconds. In a further mode, the sampler 220 detects edges in the activity signal, corresponding to changes in state of the activity signal.

If the state of the activity signal changes, state change data is sent via a bus controller 230 to a USB bus connector 240 on the keyboard. The state change data is in the form of a transaction with a command for a activity indicator function to execute. The commands comprise commands representative of turning an activity indicator on and off, such as "INDICATOR ON" and "INDICATOR OFF". A latch 250, is used to control the state of the indicator 260 consistent with the sampled activity. In one embodiment, the indicator 260 is a light that goes on and off in accordance with the received commands. When the light is on, that corresponds to disk drive activity. An off state corresponds to no drive activity.

In one embodiment, the cursor control device 150 is a mouse, trackball or touchpad and has a housing and a cursor input device. The cursor input device is suitable for providing an output indicating movement of a cursor to an information handling system, such as a personal computer. A key disposed on the housing is suitable for enabling a user to select a cursor position. An activity indicator is disposed on the housing for indicating activity of an electronic data storage device disposed in the information handling system.

Figure 3:
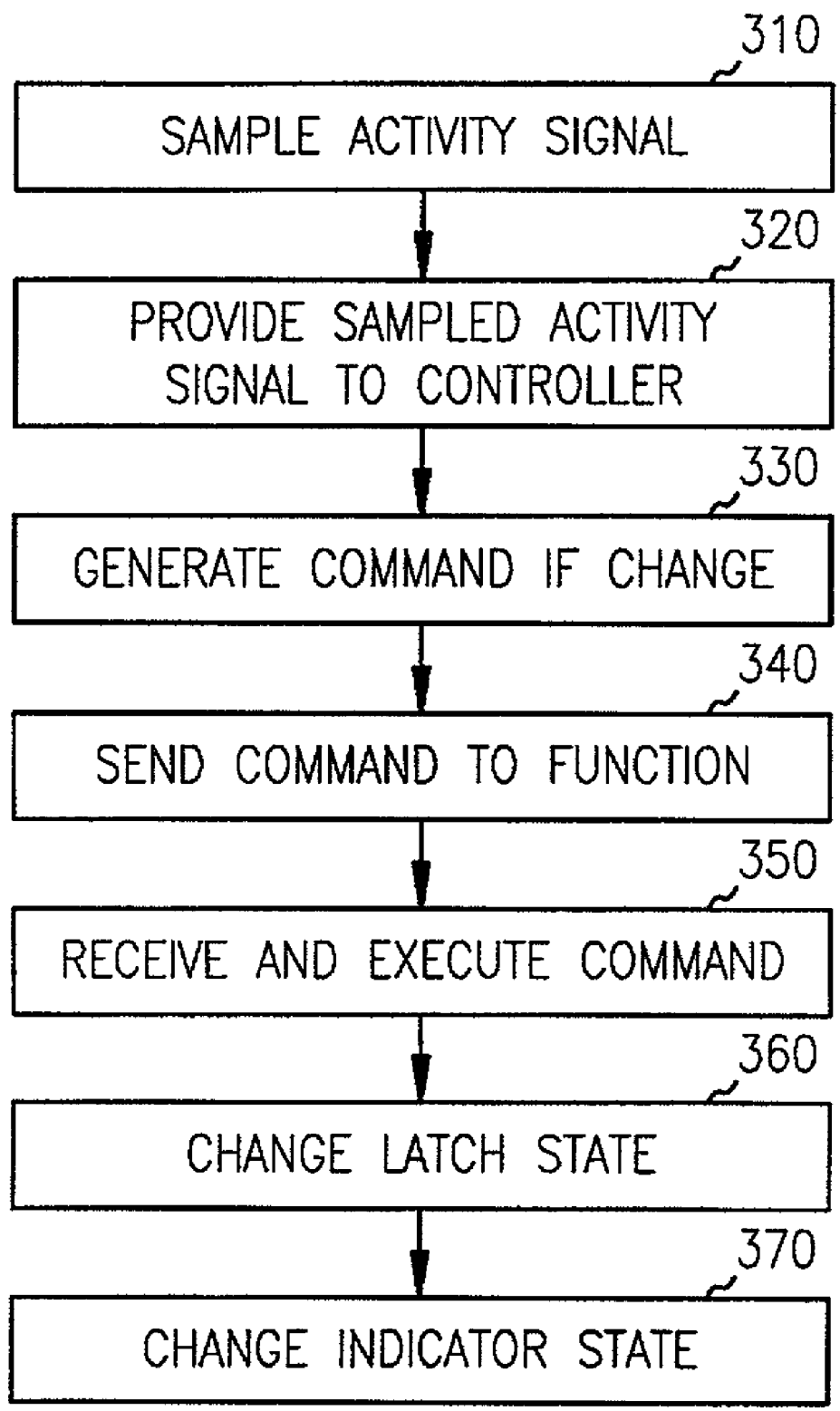
FIG. 3 is a flow chart of operation of remote disk activity indicator control.

A flowchart showing operation of the functions of the present invention is provided in FIG. 3. The functions are implemented by software executing on one or more processors, such as device drivers, either alone or in combination with other hardware or firmware. The functions are also described as modules. Functions may be implemented in one or more modules as desired.

At 310, the activity signal provided by the drive is sampled. The sampling rate in one embodiment is approximately every 30 milliseconds. This sampling rate provides a fairly accurate rate of sampling, yet minimizes bus traffic. Higher sampling rates provide more accuracy and consume more bandwidth. Lower rates are desired in further embodiments to further minimize bandwidth utilization.

A sampled activity signal is provided to a controller module at 320. The controller module determines whether the sampled activity signal indicates activity, or no activity. In one embodiment, the controller keeps a record of recent activity signal indications, and generates a command at 330 if the activity has changed since the last activity indication. In one embodiment, the command is simply a change command. In further embodiments, two different commands are generated, an "ON" command and an "OFF" command corresponding to the desired state of a remote activity indicator.

In yet a further embodiment, the history of activity signals is analyzed to provide a filtered analysis. If the activity state is changing rapidly, indicative of intermittent activity of the drive, the sampled activity signal is filtered to minimize the number of commands sent and prevent rapid changing in the remote indicator. In one embodiment, an average of the most recent five or more sampled activity signals is used to determine the command and whether or not to send a new command indicative of a change of state of the activity of the drive. In a further embodiment, 3 or more consecutive identical sampled activity signals are utilized to determine whether or not to send a change command. In still further embodiments, the number of consecutive identical activity indications is different for determining whether to send an ON command or an OFF command. Many other variations may be used.

Once the command is generated at 330, it is sent to a function at 340 in one embodiment for controlling the state of the remote activity indicator. The function in one embodiment is a USB function. The function receives and executes the command at 350. In further embodiments, many different methods of communicating the sampled state of the activity of the drive are used. Wireless transceivers are used in one embodiment to communicate the sampled activity of the drive to the remote indicator. Hardwired connections are used in a further embodiment with high and low logic levels controlling the state of the remote activity indicator.

At 360, a latch state is changed if necessary to control or change the state of the remote indicator at 370. In one embodiment, the latch function is incorporated into the remote indicator. If the received command indicates no change in state, the output of the latch does not change. The latch function is used to maintain the state of the remote indicator until a change is commanded. The function can be implemented in one of many different ways known to one of skill in the art.

What is claimed is:

1. An information handling system comprising:
   a case defining an interior;
   a central processing unit in the interior of the case;
   a cursor control device having a housing separate from the case to permit movement of the cursor control device independent of the case;
   a data storage device mounted on the case;
   a sampler that detects storage device activity at selected intervals; and
   a controller providing an activity signal corresponding to any activity of the data storage device;
   an activity indicator configured to receive the activity signal from the controller;
   wherein the activity indicator is mounted on the housing of the cursor control device separate from the case in a remote relationship to the data storage device mounted on the case.

2. The information handling system of claim 1 wherein the controller is coupled to USB function corresponding to the activity indicator.

3. The information handling system of claim 1 wherein the data storage device generates an activity signal representative of data transfer.

4. The information handling system of claim 3 wherein the sampler samples the activity signal generated by the date storage device.

5. The information handling system of claim 1 wherein the data storage device is a hard disk drive.

6. The information handling system of claim 1 wherein the data storage device is a CD drive.

7. The information handling system of claim 1 wherein the cursor control device is a computer mouse.

8. The information handling system of claim 1 wherein the cursor control device is a keyboard.

9. A method of providing a remote indication of storage device activity, the method comprising:
   providing an information handling system with a case defining an interior, a storage device mounted on the case, and a central processing unit in the interior of the case;
   providing a cursor control device having a housing separate from the case to permit movement of the cursor control device independent of the case, an activity indicator mounted on the housing of the cursor control device separate from the case in a remote relationship to the data storage device mounted on the case;
   sampling activity of the storage device;
   providing a signal representative of the sampled activity to a controller; and
   generating commands for the remote activity indicator to control the activity indicator in accordance with the sampled activity.

10. The method of claim 9 and further comprising providing the commands to the remote activity indicator via a USB bus.

11. The method of claim 9 wherein the commands comprising ON and OFF representations.

12. The method of claim 9 comprising controlling the activity indicator in accordance with the commands.

13. A keyboard that provides input to an information handling system having a case and an electronic data storage device mounted on the case, the keyboard comprising:
   a housing separate from the case of the information handling system to permit movement of the keyboard independent of the case;
   a plurality of keys disposed on the housing; and
   an activity indicator responsive to sampled activity of the electronic data storage device in the information handling system;
   wherein the activity indicator is mounted on the housing of the keyboard separate from the case in a remote relationship to the electronic data storage device mounted on the case.

14. The keyboard of claim 13 and further comprising a latch to latch the activity indicator to a state consistent with the sampled activity.

15. The keyboard of claim 14 wherein the activity indicator comprises an LED.

16. The keyboard of claim 13 and further comprising a USB connector.

17. The keyboard of claim 16 wherein the activity indicator is responsive to commands generated as a function of the sampled activity.

18. An input device that provides input to an information handling system having a case and an electronic data storage device mounted on the case, the input device comprising:
- a housing separate from the case to permit movement of the housing independent of the case;
- means for enabling a user to provide input to the information handling system, the enabling means being located on the housing;
- means for indicating activity of a data storage device in the case of the information handling system;
- means for sampling activity of the data storage device, the sampling means being located on the case of the information handling system; and
- means for communicating with the input device, the communicating means being located on the case of the information handling system;
- wherein the means for indicating activity is mounted an the housing with the enabling means separate from the case in a remote relationship to the data storage device mounted on the case.

19. The input device of claim 18 wherein the means for communicating with the input device is a USB controller.

20. The input device of claim 18 wherein the means for communicating with the input device generates commands for controlling the means for indicating activity.

21. The input device of claim 18 wherein the input device is located remotely from the data storage device.

22. The input device of claim 18 wherein the means for enabling a user to provide input to the information handling system is a keyboard.

23. The input device of claim 18 wherein the means for indicating activity comprises a light.

24. A cursor movement controlling mouse device, comprising:
- mouse housing separate from a case of an information handling system such that the mouse housing is movable independent of the case of the information handling system;
- a cursor input device on the mouse housing, the cursor input device suitable for providing an output indicating movement of a cursor to at the information handling system;
- a key disposed on the mouse housing, the key suitable for enabling a user to select a cursor position; and
- an activity indicator disposed on the mouse housing, the activity indicator configured to indicate activity of a data storage CD drive device disposed in the case of the information handling system;
- and
- wherein the activity indicator is mounted on the mouse housing separate from the case in a remote relationship to the CD drive device mounted on the case.

* * * * *